(12) United States Patent
Seo et al.

(10) Patent No.: US 8,806,498 B2
(45) Date of Patent: Aug. 12, 2014

(54) METHOD AND SYSTEM FOR RESOLVING DEPENDENCY AMONG THE ENQUEUED WORKS AND/OR FINISHED WORKS AND SCHEDULING THE DEPENDENCY-RESOLVED WORKS

(75) Inventors: Sung-Jong Seo, Hwaseong-si (KR); Sung-Hak Lee, Yongin-si (KR); Dong-Woo Im, Yongin-si (KR); Hyo-Jung Song, Seoul (KR); Seung-Mo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 13/023,848

(22) Filed: Feb. 9, 2011

(65) Prior Publication Data

US 2012/0047514 A1 Feb. 23, 2012

(30) Foreign Application Priority Data

Aug. 18, 2010 (KR) ........................ 10-2010-0079902

(51) Int. Cl.
*G06F 9/46* (2006.01)

(52) U.S. Cl.
USPC ............ 718/102; 718/103; 718/104; 718/106

(58) Field of Classification Search
USPC .................................. 718/102, 103, 104, 106
See application file for complete search history.

(56) References Cited

U.S. PATENT DOCUMENTS

| | | | |
|---|---|---|---|
| 5,822,561 A | 10/1998 | Nakajima | |
| 6,463,522 B1 | 10/2002 | Akkary | |
| 6,662,203 B1 | 12/2003 | Kling et al. | |
| 6,714,961 B1 | 3/2004 | Holmberg et al. | |
| 6,877,086 B1 | 4/2005 | Boggs et al. | |
| 7,263,695 B1 * | 8/2007 | Muzaffar et al. | 717/162 |
| 7,650,602 B2 * | 1/2010 | Amamiya et al. | 718/104 |
| 7,917,906 B2 * | 3/2011 | Walker | 718/104 |
| 8,347,301 B2 * | 1/2013 | Li et al. | 718/104 |
| 2003/0177288 A1 | 9/2003 | Kunimatsu et al. | |
| 2006/0085365 A1 | 4/2006 | Cho | |
| 2007/0174831 A1 * | 7/2007 | Lee et al. | 717/174 |
| 2008/0059966 A1 | 3/2008 | Du et al. | |
| 2009/0070772 A1 * | 3/2009 | Shikano | 718/106 |
| 2009/0154572 A1 | 6/2009 | Baik et al. | |
| 2010/0115048 A1 * | 5/2010 | Scahill | 709/213 |
| 2010/0333109 A1 * | 12/2010 | Milnor | 718/106 |

FOREIGN PATENT DOCUMENTS

| | | |
|---|---|---|
| KR | 10-1996-0035300 | 10/1996 |
| KR | 10-2000-0038010 | 7/2000 |
| KR | 10-2001-0024751 | 3/2001 |
| KR | 10-2001-0080469 | 8/2001 |
| KR | 10-2003-0074047 | 9/2003 |
| KR | 10-2006-0028153 | 3/2006 |
| KR | 10-2009-0045944 | 5/2009 |
| KR | 10-2009-0065398 | 6/2009 |

* cited by examiner

*Primary Examiner* — Meng An
*Assistant Examiner* — Abu Ghaffari
(74) *Attorney, Agent, or Firm* — NSIP Law

(57) ABSTRACT

A scheduling apparatus and method allocate a plurality of works to a plurality of processing cores by transferring a work having no dependency on the execution completion of another work from a dependency queue to a runnable queue, transferring the work from the runnable queue to an idle one of the processing cores for execution, transferring the work executed by the one processing core to a finish queue, where the work becomes designated a finished work, and transferring a work within the dependency queue, having a dependency upon the execution completion of the finished work, to the runnable queue.

15 Claims, 10 Drawing Sheets

METHOD AND SYSTEM FOR RESOLVING DEPENDENCY AMONG THE ENQUEUED WORKS AND/OR FINISHED WORKS AND SCHEDULING THE DEPENDENCY-RESOLVED WORKS

CROSS-REFERENCE TO RELATED APPLICATION(S)

This application claims the benefit under 35 U.S.C. §119(a) of Korean Patent Application No. 10-2010-0079902, filed on Aug. 18, 2010, in the Korean Intellectual Property Office, the entire disclosure of which is incorporated herein by reference for all purposes.

BACKGROUND

1. Field

The following description relates to a scheduling apparatus for use with a multicore system and which is equipped with one or more queues enqueuing therein works each having a dependency descriptor, and an operating method of the scheduling apparatus, and, particularly, to a scheduling apparatus and method which can provide a queue for each application for enqueuing one or more applications provided by each application, can allow works that need to be processed by a multicore system to be provided from the queue to the multicore system, and can thus reduce the time taken for the multicore system to execute works.

2. Description of the Related Art

A typical scheduling technique for a multicore system shared by a plurality of applications generally involves performing dependency resolving, which is characterized by resolving the dependence on finished works, if any, of works in dependency queues, searching all the dependency queues for runnable works, determining whether all the works in the dependency queues are dependency-resolved, and issuing a request for the execution of the runnable works in the dependency queues to one or more idle cores of the multicore system.

However, the multicore system may often be maintained to be idle until the dependency resolving operation and the runnable work search operation are both complete, which may decrease the efficiency of the multicore system.

SUMMARY

In one general aspect, there is provided a scheduling apparatus to allocate a plurality of works provided by one or more applications to a plurality of cores so that the applications share the cores, the scheduling apparatus including a runnable queue configured to enqueue therein the plurality of works in order of execution in consideration of any dependency therebetween, and a finish queue configured to enqueue therein finished works whose execution is complete.

The scheduling apparatus may also include a scheduler configured to enqueue the finished works returned from one of the cores in the finish queue, wherein, if there is one or more works having dependency on the returned finished works, the scheduler is configured to perform dependency resolving on the one or more works having dependency on the returned finished works and enqueue the dependency-resolved works into the runnable queue.

The scheduling apparatus may also include one or more dependency queues configured to temporarily enqueue the plurality of works therein until the plurality of works are enqueued into the runnable queue, the dependency queues respectively corresponding to the applications; and an input/output (I/O) port configured to transmit the works in the runnable queue to the cores and receive the finished works from the cores.

The scheduling apparatus may further include a scheduler configured to search the dependency queues for one or more runnable works with no dependency and enqueue the one or more runnable works into the runnable queue, to transmit the one or more works in the runnable queue to the cores via the I/O port so that the transmitted one or more works can be executed by any idle one of the cores, and to receive the finished works from the cores via the I/O port and enqueue the received finished works in the finish queue.

The scheduler may be further configured to perform dependency resolving on one or more works in the dependency queues having dependency on any one of the finished works in the finish queue.

The scheduler may be further configured to perform dependency resolving on the works in the dependency queues in real time upon the receipt of the finished works from the cores or at regular intervals of time.

The scheduler may be further configured to transmit one of the works in the runnable queue, upon the receipt of one of the finished works from one of the cores, to the core that has transmitted the one of the finished works so that the transmitted work can be executed by the corresponding core.

The scheduler may be further configured to, during the execution of works by the cores, perform the dependency resolving on the one or more works in the dependency queues, search the dependency queues for the one or more runnable works with no dependency, and enqueue the one or more runnable works into the runnable queue.

In another general aspect, there is provided a scheduling method of allocating a plurality of works provided by one or more applications to a plurality of cores so that the applications share the cores, the scheduling method including enqueuing the plurality of works in order of execution in consideration of any dependency therebetween, and enqueuing finished works whose execution is complete.

The scheduling method may further include enqueuing the finished works returned from one of the cores, wherein, if there is one or more works having dependency on the returned finished works, the enqueuing of the finished works includes performing dependency resolving on the one or more works having dependency on the returned finished works and enqueuing the dependency-resolved works.

The scheduling method may further include searching the plurality of works for one or more runnable works with no dependency and enqueuing the runnable works, transmitting the runnable works to the cores so that the transmitted runnable works can be executed by any idle one of the cores, and receiving one or more of the finished works from the cores and enqueuing the received finished works.

The scheduling method may further include performing dependency resolving on one or more of the plurality of works having dependency on any one of the finished works.

The scheduling method may further include transmitting one of the runnable works, upon the receipt of one of the finished works from one of the cores, to the core that has transmitted the one of the finished works so that the transmitted runnable work can be executed by the corresponding core.

The scheduling method may further include, during the execution of the works by the cores, performing dependency resolving on one or more of the plurality of works having dependency on any one of the finished works, searching the plurality of works for one or more of the runnable works with no dependency, and enqueuing the runnable works.

In another general aspect, there is provided a scheduling method of allocating a plurality of works provided by one or more applications to a plurality of cores using a scheduling apparatus, which includes a runnable queue configured to enqueue therein the plurality of works therein in order of execution in consideration of any dependency therebetween and a finish queue configured to enqueue therein finished works whose execution is complete, so that the applications share the cores, the scheduling method including determining whether the runnable queue is empty, if there is one or more runnable works in the runnable queue, determining whether any one of the cores is idle, if one of the cores is idle, transmitting one of the runnable works in the runnable queue to the idle core, if the runnable queue is empty or if none of the cores are idle, determining whether the finish queue is empty; and if there is one or more finished works in the finish queue, performing dependency resolving on one or more of the plurality of works having dependency on any one of the finished works in the finish queue.

The scheduling method may further include, if the finish queue is empty, determining whether there is one or more of the runnable works with no dependency among the plurality of works, and if there is one or more of the runnable works with no dependency among the plurality of works, enqueuing the runnable works in the runnable queue.

After the transmitting of the runnable works in the runnable queue to the respective idle cores, or if there is no runnable work among the plurality of works, the scheduling method may return to the determining of whether the runnable queue is empty.

The scheduling method may further include, if there is one or more runnable works with no dependency among the plurality of works, obtaining all works provided by the same applications as the runnable works, performing dependency resolving on the obtained works in connection with the finished works in the finish queue, and enqueuing the dependency-resolved works into the runnable queue.

The scheduling method may be performed at least partially during the execution of the works by the cores.

If there is one or more runnable works with no dependency among the plurality of works and the runnable works are provided by more than one application, performing dependency resolving on all works provided by each of the applications and enqueuing the dependency-resolved works into the runnable queue.

Other features and aspects may be apparent from the following detailed description, the drawings, and the claims.

Figure 1:
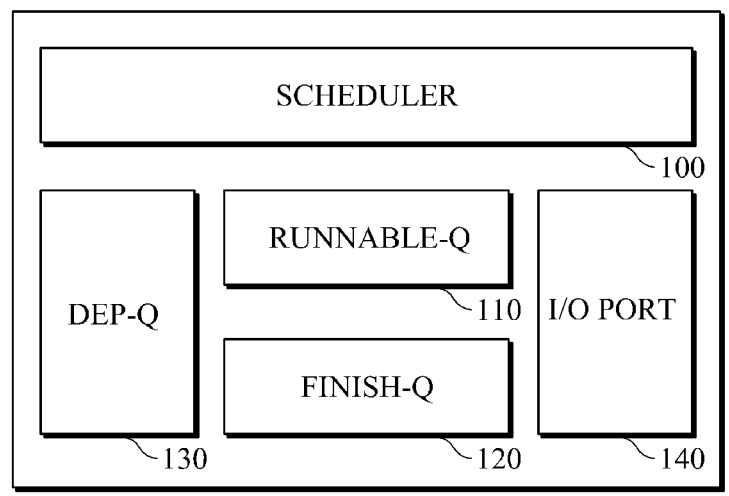
FIG. 1 is a diagram illustrating an example of a scheduling apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a scheduling apparatus. Referring to FIG. 1, the scheduling apparatus may include a scheduler 100, a runnable queue (runnable-Q) 110, a finish queue (finish-Q) 120, a dependency queue (dep-Q), 130 and an input/output (I/O) port 140.

The operation of the scheduling apparatus, which may allocate a plurality of works provided by one or more applications to multiple cores of a multicore system (not shown), may be largely classified into a first operation, which is associated with the applications, and a second operation, which is associated with the multicore system.

The first operation may be characterized by allowing the applications to enqueue into the dep-Q 130 a plurality of works to be processed in parallel by the multicore system, and the second operation may be characterized by issuing a request for the execution of works with no dependency to one or more idle cores of the multicore system and notifying the scheduling apparatus of the completion of the execution of works.

The scheduling apparatus may operate in a system with separate cores from those of the multicore system, and may have an execution flow independent of applications. That is, the operation of enqueuing works into the dep-Q 130 and the operation of the execution of works in the multicore system may be performed in parallel with the operation of the scheduling apparatus.

The runnable-Q 110 may enqueue a number of runnable works provided by one or more applications therein in order of execution. The finish-Q 120 may enqueue works whose execution is complete, i.e., finished works, therein.

A plurality of works provided by one or more applications may all be enqueued into the dep-Q 130 in units of the applications before being input to the runnable-Q 110.

The I/O port 140 may transmit the works in the runnable-Q 110 to the multicore system and may receive finished works from the multicore system.

In a case in which a finished work is returned from the multicore system, the scheduler 100 may enqueue the finished work into the finish-Q 120. In a case in which there are works having dependency on the finished work in the dep-Q 130, the scheduler 100 may perform dependency resolving on the works having dependency on the finished work and may enqueue the dependency-resolved works into the runnable-Q 110.

The scheduler 100 may search the dep-Q 130 for runnable works with no dependency and may enqueue the runnable works into the runnable-Q 110. The scheduler 100 may transmit the runnable works in the runnable-Q 110 to one or more idle cores of the multicore system through the I/O port 140 so that the corresponding works can be executed by the idle cores of the multicore system. The scheduler 100 may receive finished works from the multicore system through the I/O port 140 and may enqueue the received finished works into the finish-Q 120.

During the execution of works by the multicore system, the scheduler 100 may perform dependency resolving on the works in the dep-Q 130, may search the dep-Q 130 for runnable works, and may enqueue the runnable works into the runnable-Q 110.

Therefore, the scheduling apparatus can effectively run works provided by various applications in consideration of the dependency therebetween.

Figure 2:
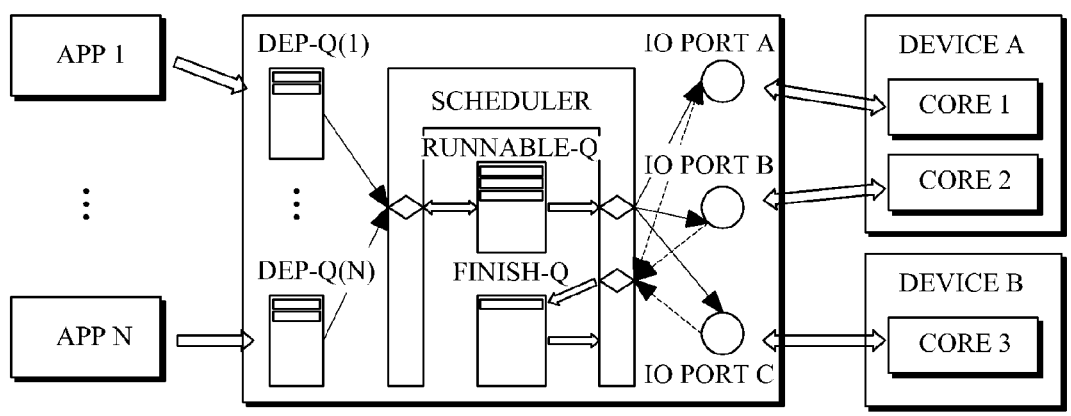
FIG. 2 is a flowchart illustrating a multicore system having an example of the scheduling apparatus.

FIG. 2 is a diagram illustrating an example of a multicore system having an example of the scheduling apparatus. Referring to FIG. 2, the scheduling apparatus may include a scheduler, a runnable-Q, and a finish-Q, which may all be disposed between a plurality of dependency queues (e.g., dep-Q(1) through dep-Q(N)), in which works provided by a plurality of applications (e.g., App 1 through App N) are enqueued, and a plurality of IO ports (e.g., IO ports A, B, and C), through which works are transmitted between the scheduling apparatus and a multicore system including a plurality of devices (e.g., devices A and B). The number and configuration of the various applications, queues, and devices illustrated in FIG. 2 are merely examples, and any of various different combinations may be employed in the multicore system.

Runnable works that have had their respective dependencies resolved may be collected in the runnable-Q, and finished works may be collected in the finish-Q.

In a case in which the execution of works by the core(s) of device A and/or B, e.g., cores 1 through 3, is complete, the works may be enqueued in the finish-Q, and cores 1 through 3 may be placed in an idle state. The scheduler may dequeue one or more runnable works in the runnable-Q and may issue a request for the execution of the dequeued runnable works to any idle one of cores 1 through 3.

In a case in which the execution of works by devices A and B is complete, the scheduling apparatus may perform dependency resolving on works in dep-Q(1) through dep-Q(N) that have dependency on any one of the works in the finish-Q, and may search dep-Q(1) through dep-Q(N) for other runnable works with no dependency. The scheduling apparatus may move all the runnable works in dep-Q(1) through dep-Q(N) to the runnable-Q.

In this manner, in a case in which one or more of the cores of a multicore system become idle, a request for the execution of runnable works standing by in the runnable-Q may be issued to the idle one or more cores of the multicore system without being delayed by dependency resolving or a runnable work search.

Figure 3:
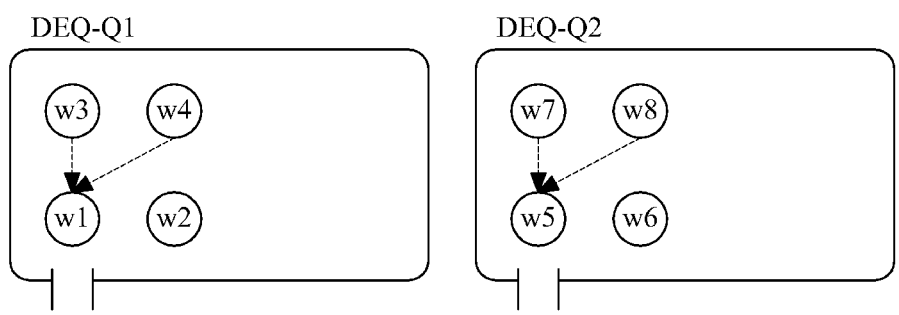
FIG. 3 is a diagram illustrating the dependence between works enqueued in each dependency queue of an example scheduling apparatus.

FIG. 3 is a diagram illustrating the dependency between works enqueued in each dep-Q of an example scheduling apparatus. Referring to FIG. 3, the scheduling apparatus may include a plurality of dependency queues (e.g., dep-Q1 and dep-Q2), and each dep-Q may have four works. More specifically, in this example dep-Q1 may include first through fourth works w1 through w4, and dep-Q2 may include fifth through eighth works w5 through w8.

In this example, the first, second, fifth, and sixth works w1, w2, w5 and w6 do not have dependency on the other works and are thus readily runnable. The third and fourth works w3 and w4 are dependent on the first work w1 and can only be executed in response to the execution of the first work w1 being complete. The seventh and eighth works w7 and w8 are dependent on the fifth work w5 and can only be executed in response to the execution of the fifth work w5 being complete.

It will hereinafter be described in detail how a multicore system can process the first through eighth works w1 through w8 in consideration of the dependency between the works in each of dep-Q1 and dep-Q2 with reference to FIGS. 4 through 6.

Figure 4:
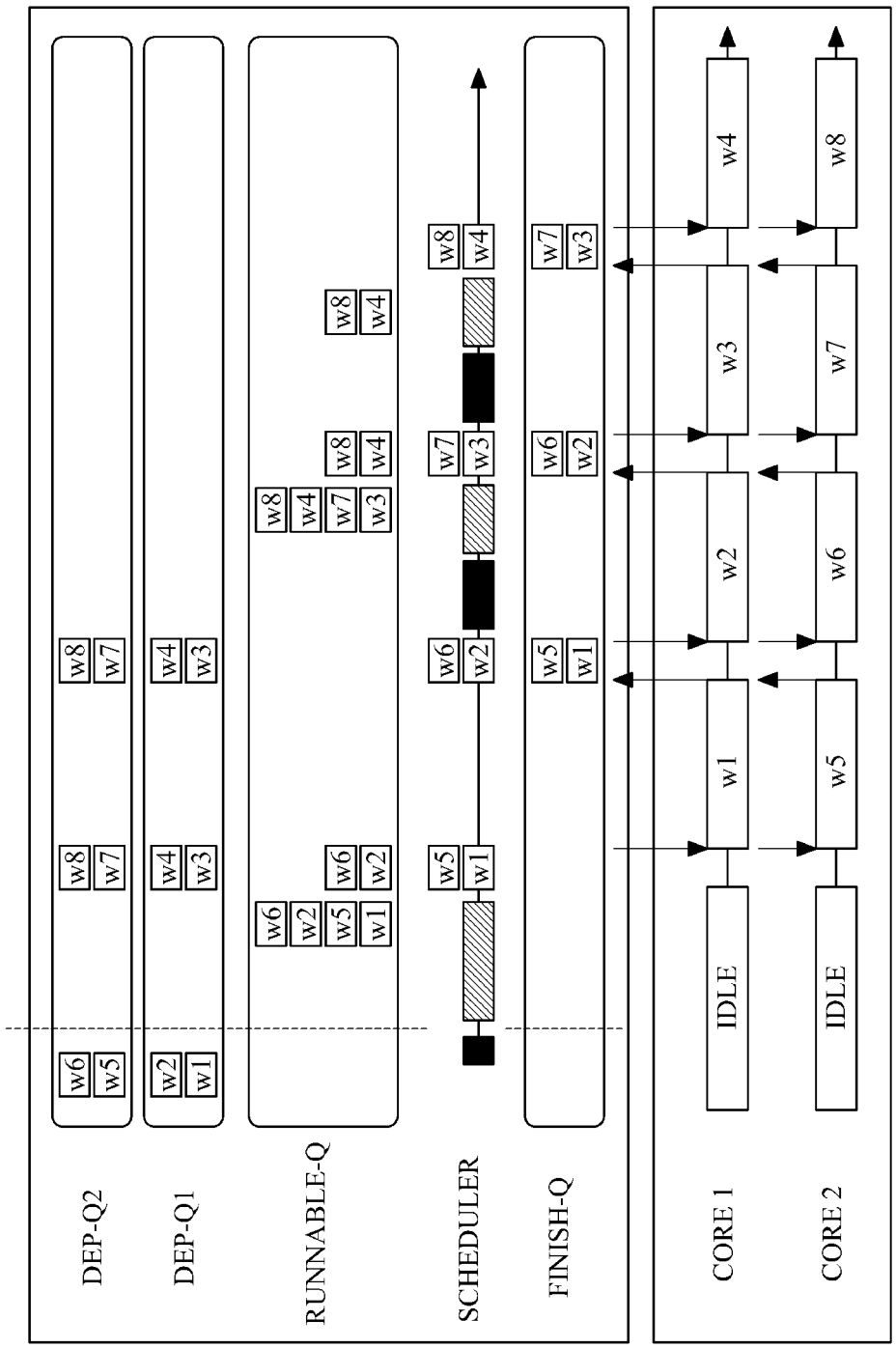
FIG. 4 is a diagram illustrating an example of how a multicore system having an example scheduling apparatus can process works.

FIG. 4 is a diagram illustrating an example of how a multicore system having an example scheduling apparatus can process the first through eighth works w1 through w8, and, more particularly, how two applications may issue a request for works to a multicore system having two cores (e.g., cores 1 and 2) via a plurality of dependency queues (e.g., dep-Q1 and dep-Q2). Referring to FIG. 4, the first and second works w1 and w2 and the fifth and sixth works w5 and w6 may be enqueued in dep-Q1 and dep-Q2, respectively, and then the third and fourth works w3 and w4 and the seventh and eighth works w7 and w8 may be additionally enqueued in dep-Q1 and dep-Q2, respectively. Cores 1 and 2 may initially be in an idle state. In a case in which dep-Q1 and dep-Q2 both have works with no dependency, the works in dep-Q1 may have the same chance of being dequeued as the works in dep-Q2.

In order to issue a request for the execution of works to an idle core of a multicore system, dependency resolving and a runnable work search may both be performed first.

For example, the scheduling apparatus may identify that core 1 is idle, and may search all the dependency queues thereof for runnable works. As a result, the first and second works w1 and w2 and the fifth and sixth works w5 and w6 may be dequeued from dep-Q1 and dep-Q2, respectively, and may then be enqueued in a runnable-Q. Thereafter, the scheduling apparatus may dequeue the first work w1 from the runnable-Q and may issue a request for the execution of the first work w1 to core 1.

At approximately the same time as the issuing of the request, or soon thereafter, the scheduling apparatus may identify that core 2 is idle, may dequeue the fifth work w5 from the runnable-Q, and may issue a request for the execution of the fifth work w5 to core 2. Since cores 1 and 2 may both be busy executing the first and fifth works w1 and w5, respectively, the scheduling apparatus may identify that cores 1 and 2 are both not idle, and may attempt to perform dependency resolving and search for runnable works while sequentially searching through a finish-Q, dep-Q1 and dep-Q2.

In response to the execution of the first work w1 by core 1 being complete, core 1 may enqueue the first work 1 in the finish-Q and may be placed back in the idle state. Thereafter, the scheduling apparatus may dequeue the second work w2 from the runnable-Q and may issue a request for the execution of the second work w2 to core 1. In response to the execution of the fifth work w5 by core 2 being complete, core 2 may enqueue the fifth work w5 in the finish-Q, and may be placed back in the idle state. The scheduling apparatus may identify that core 2 is idle, may dequeue the sixth work w6 from the runnable-Q, and may issue a request for the execution of the sixth work w6 to core 2. Since cores 1 and 2 may both be busy executing the second and sixth works w2 and w6, respectively, the scheduling apparatus may identify that cores 1 and 2 are both not idle, and may attempt to perform dependency resolving and search for runnable works while sequentially searching through the finish-Q, dep-Q1 and dep-Q2. The third and fourth works w3 and w4 and the seventh and eighth works w7 and w8 may all be moved from dep-Q1 and dep-Q2, respectively, to the runnable-Q using the same method used to move the first and second works w1 and w2 and the fifth and sixth works w5 and w7 from dep-Q1 and dep-Q2, respectively, to the runnable-Q.

In this manner, it is possible to perform dependency resolving and a runnable work search in parallel with the execution of works by a multicore system. In addition, since the scheduling apparatus is equipped with a finish-Q in which finished works can be enqueued, it is possible to issue a request for the execution of works to a multicore system before the performing of dependency resolving on works having dependency on the finished works in the finish-Q and thus to maintain the parallel relationship between a scheduling apparatus and an external system.

Figure 5:
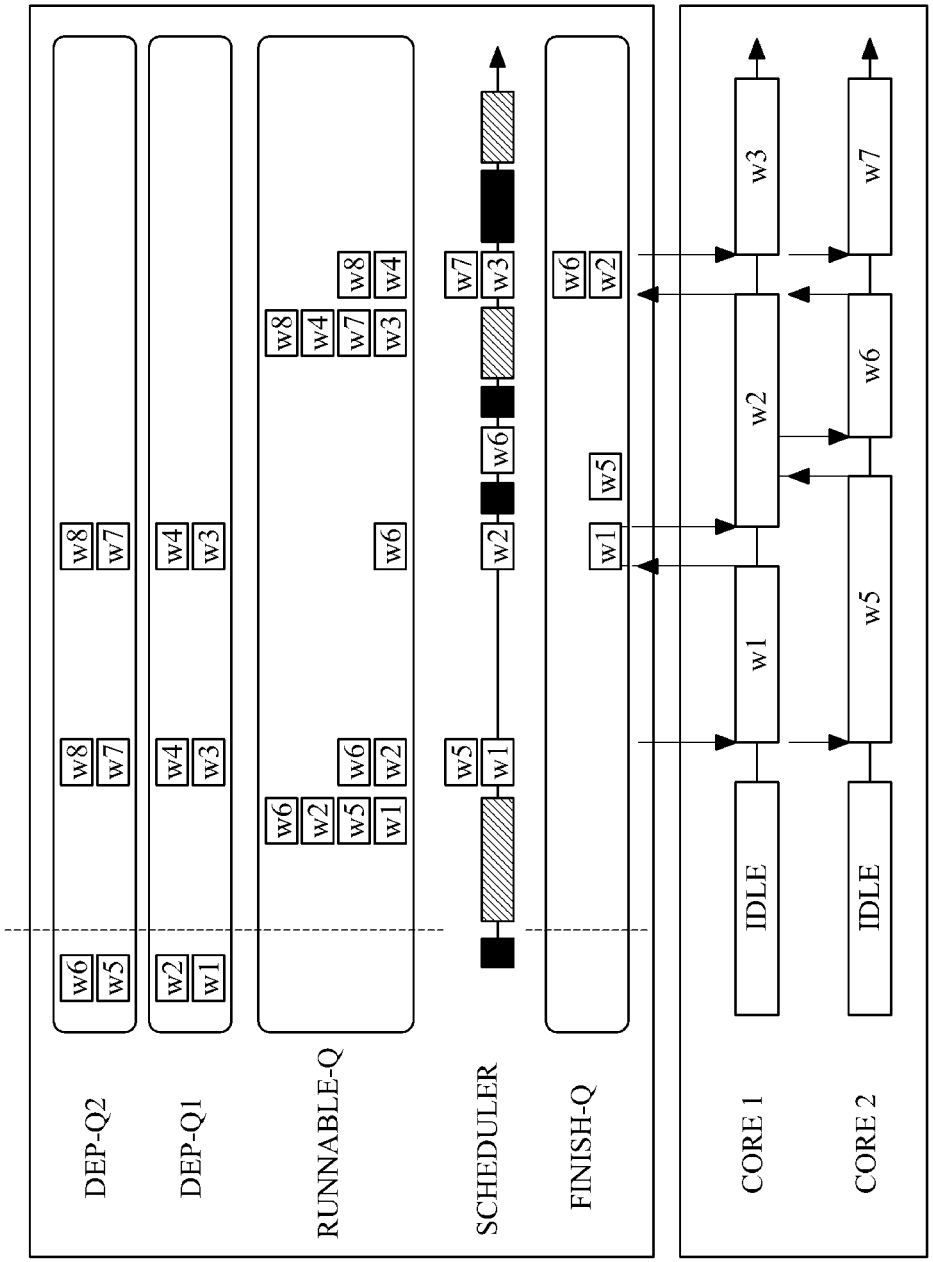
FIG. 5 is a diagram illustrating another example of how a multicore system having an example scheduling apparatus can process works.

FIG. 5 is a diagram illustrating another example of how a multicore system having an example scheduling apparatus can process the first through eighth works w1 through w8, and, particularly, how two applications may issue a request for works to a multicore system having two cores (e.g., cores 1 and 2) via a plurality of dependency queues (e.g., dep-Q1 and dep-Q2). Referring to FIG. 5, the first and second works w1 and w2 and the fifth and sixth works w5 and w6 may be enqueued in dep-Q1 and dep-Q2, respectively, and the third and fourth works w3 and w4 and the seventh and eighth works w7 and w8 may be additionally enqueued in dep-Q1 and dep-Q2, respectively. Cores 1 and 2 may initially be in an idle state. In a case in which dep-Q1 and dep-Q2 both have works with no dependency, the works in dep-Q1 may have the same chance of being dequeued as the works in dep-Q2.

The operation of the multicore system illustrated in FIG. 5 may be almost the same as the operation of the multicore system illustrated in FIG. 4. That is, the scheduling apparatus may determine which of cores 1 and 2 is idle, and may search dep-Q1 and dep-Q2 for runnable works. As a result, the first and second works w1 and w2 and the fifth and sixth works w5 and w6 may be dequeued from dep-Q1 and dep-Q2, respectively, and may then be enqueued in a runnable-Q. The scheduling apparatus may dequeue the first work w1 from the runnable-Q and may issue a request for the execution of the first work w1 to core 1.

At approximately the same time as the issuing of the request, or soon thereafter, the scheduling apparatus may identify that core 2 is idle, may dequeue the fifth work w5 from the runnable-Q, and may issue a request for the execution of the fifth work w5 to core 2. Since cores 1 and 2 may both be busy executing the first and fifth works w1 and w5, respectively, the scheduling apparatus may identify that cores 1 and 2 are both not idle, and may attempt to perform dependency resolving and search for runnable works while sequentially searching through a finish-Q, dep-Q1, and dep-Q2.

In response to the execution of the first work w1 by core 1 being complete, core 1 may enqueue the first work 1 in the finish-Q and may be placed back in the idle state. Thereafter, the scheduling apparatus may dequeue the second work w2 from the runnable-Q and may issue a request for the execution of the second work w2 to core 1. The second work w2 may be executed by core 1 while the fifth work w5 is still being executed by core 2. In response to the execution of the fifth work w5 by core 2 being complete, core 2 may enqueue the fifth work w5 in the finish-Q, and may be placed back in the idle state. The scheduling apparatus may identify that core 2 is idle, may dequeue the sixth work w6 from the runnable-Q, and may issue a request for the execution of the sixth work w6 to core 2. More specifically, while cores 1 and 2 are both busy executing the second and sixth works w2 and w5, respectively, the scheduling apparatus may perform dependency resolving on the first work w1. In response to the fifth work w5 being enqueued in the finish-Q and the performing of dependency resolving on the first work w1 not yet being complete, the scheduling apparatus may stop performing dependency resolving on the first work w1 and may issue a request for the execution of the sixth work w6 to core 2. As a result, the sixth work w6 may be executed by core 2 while the second work w2 is still being executed by core 1. In response to cores 1 and 2 both being busy executing second and sixth works w2 and w6, respectively, the scheduling apparatus may perform dependency resolving and a runnable work search on the first and fifth works w1 and w5. The third and fourth works w3 and w4 and the seventh and eighth works w7 and w8 may all be moved from dep-Q1 and dep-Q2, respectively, to the runnable-Q using the same method used to move the first and second works w1 and w2 and the fifth and sixth works w5 and w7 from dep-Q1 and dep-Q2, respectively, to the runnable-Q.

In this manner, it is possible to perform dependency resolving and a runnable work search in parallel with the execution of works by a multicore system.

Figure 6:
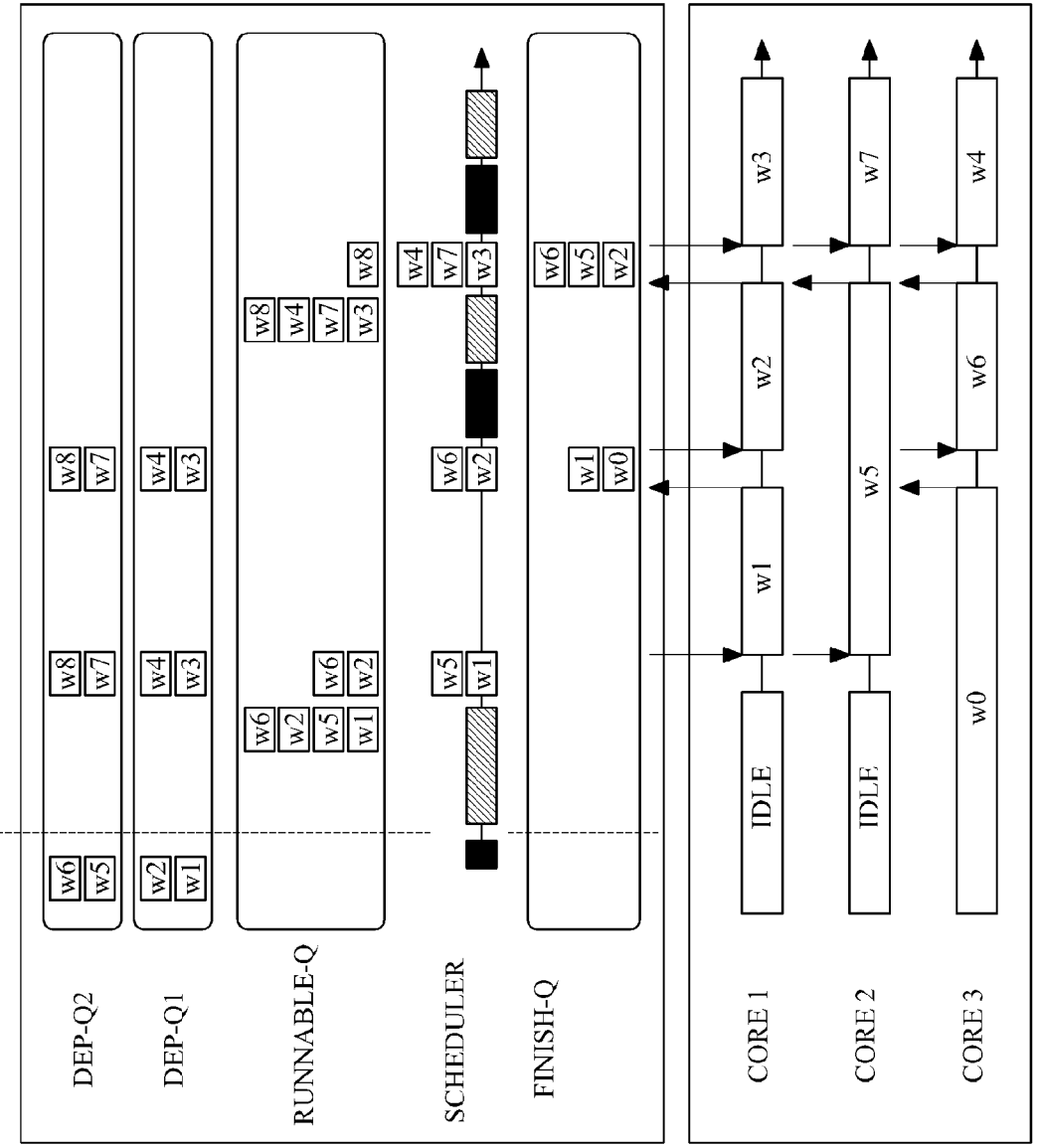
FIG. 6 is a diagram illustrating still another example of how a multicore system having an example scheduling apparatus can process works.

FIG. 6 is a diagram illustrating still another example of how a multicore system having an example scheduling apparatus can process works, and, particularly, how two applications can issue a request for works to a multicore system having three cores (e.g., cores 1 through 3) via a plurality of dependency queues (e.g., dep-Q1 and dep-Q2). Referring to FIG. 6, the first and second works w1 and w2 and the fifth and sixth works w5 and w6 may be enqueued in dep-Q1 and dep-Q2, respectively, and the third and fourth works w3 and w4 and the seventh and eighth works w7 and w8 may be additionally enqueued in dep-Q1 and dep-Q2, respectively. Cores 1 and 2 may initially be in an idle state. In a case in which dep-Q1 and dep-Q2 both have works with no dependency, the works in dep-Q1 may have the same chance of being dequeued as the works in dep-Q2.

The operation of the multicore system illustrated in FIG. 6 may be almost the same as the operation of the multicore system illustrated in FIG. 4. That is, the scheduling apparatus may determine which of cores 1 and 2 is idle, and may perform a runnable work search on both dep-Q1 and dep-Q2. As a result, the first and second works w1 and w2 and the fifth and sixth works w5 and w6 may be dequeued from dep-Q1 and dep-Q2, respectively, and may then be enqueued in a runnable-Q. The scheduling apparatus may dequeue the first work w1 from the runnable-Q and may issue a request for the execution of the first work w1 to core 1.

At approximately the same time as the issuing of the request, or soon thereafter, the scheduling apparatus may identify that core 2 is idle, may dequeue the fifth work w5 from the runnable-Q, and may issue a request for the execution of the fifth work w5 to core 2. Since core 3 is executing a zeroth work w0 in this example, and thus cores 1 through 3 are all busy, the scheduling apparatus may identify that cores 1 through 3 are all not idle, and may attempt to perform dependency resolving and search for runnable works while sequentially searching through a finish-Q, dep-Q1, and dep-Q2.

In response to the execution of the first work w1 by core 1 being complete, core 1 may enqueue the first work 1 in the finish-Q and may be placed back in the idle state. Thereafter, the scheduling apparatus may dequeue the second work w2 from the runnable-Q and may issue a request for the execution of the second work w2 to core 1. In response to the execution of the zeroth work w0 by core 3 being complete, core 3 may enqueue the zeroth work w0 in the finish-Q, and may be placed in the idle state. The scheduling apparatus may identify that core 3 is idle, and may dequeue the sixth work w6 from the runnable-Q and issue a request for the execution of the sixth work w6 to core 3. As a result, the sixth work w6 may be executed by core 3 while the second and fifth works w2 and w5 are still being executed by cores 1 and 2, respectively.

While cores 1 through 3 are all busy executing second, fifth and sixth works w2, w5, and w6, respectively, the scheduling apparatus may perform dependency resolving and a runnable work search on the zeroth and first work w0 and w1. The third and fourth works w3 and w4 and the seventh and eighth works w7 and w8 may all be moved from dep-Q1 and dep-Q2, respectively, to the runnable-Q using the same method used to move the first and second works w1 and w2 and the fifth and sixth works w5 and w6 from dep-Q1 and dep-Q2, respectively, to the runnable-Q.

Thereafter, in response to the second, fifth and sixth works w2, w5, and w6 being enqueued in the finish-Q, the scheduling apparatus may dequeue the third, seventh, and fourth works w3, w7, and w4 from the runnable-Q, and may transmit the third, seventh, and fourth works w3, w7, and w4 to cores 1, 2, and 3, respectively. As a result, cores 1 through 3 may all become busy. The scheduling apparatus may perform dependency resolving and a runnable work search on the second, fifth, and sixth works w2, w5, and w6.

In this manner, it is possible to perform dependency resolving and a runnable work search in parallel with the execution of works by a multicore system.

Figure 7:
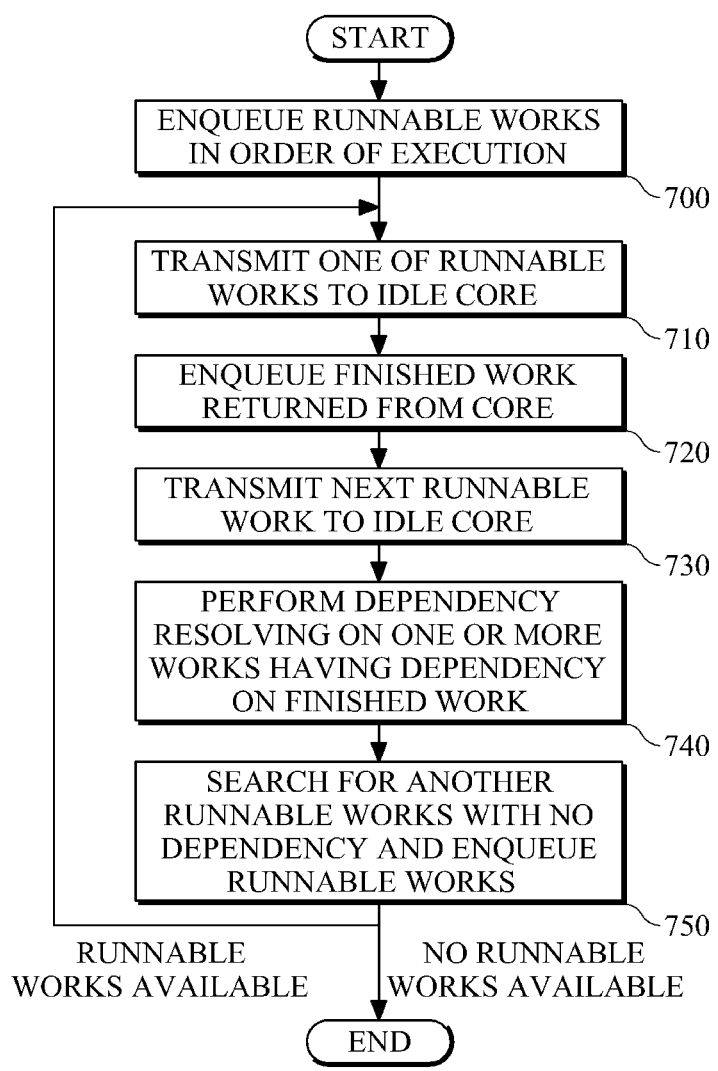
FIG. 7 is a flowchart illustrating an example of a scheduling method.

FIG. 7 is a flowchart illustrating an example of a scheduling method, i.e., the operation of a multicore system having an example scheduling apparatus. Referring to FIG. 7, a number of runnable works may be dequeued from one or more dep-Qs in which a plurality of works provided by one or more applications are enqueued in consideration of the dependency among the plurality of works, and the dequeued runnable works may be enqueued in a runnable-Q in order of execution (700). Thereafter, one of the runnable works (e.g., a first work) may be transmitted to a multicore system, and a request for the execution of the first work may be issued to the multicore system so that the first work can be executed by an idle core, if any, of the multicore system (710).

In response to the execution of the first work by the multicore system being complete, the first work may be enqueued in a finish-Q as a finished work (720). Thereafter, another one of the runnable works (e.g., a second work) next to the first work may be transmitted to the core that has just become idle by completing the execution of the first work, and a request for the execution of the second work may be issued to the multicore system (730).

Thereafter, dependency resolving may be performed on one or more works in the dep-Qs having dependency on the first work (740), other runnable works with no dependency may be searched for from the dep-Qs, and the identified runnable works may be enqueued in the runnable-Q in order of execution (750).

If there are still runnable works in the runnable-Q, the scheduling method may return to operation 710. Otherwise, the scheduling method may end unless new works are provided by the applications.

Figure 8A:
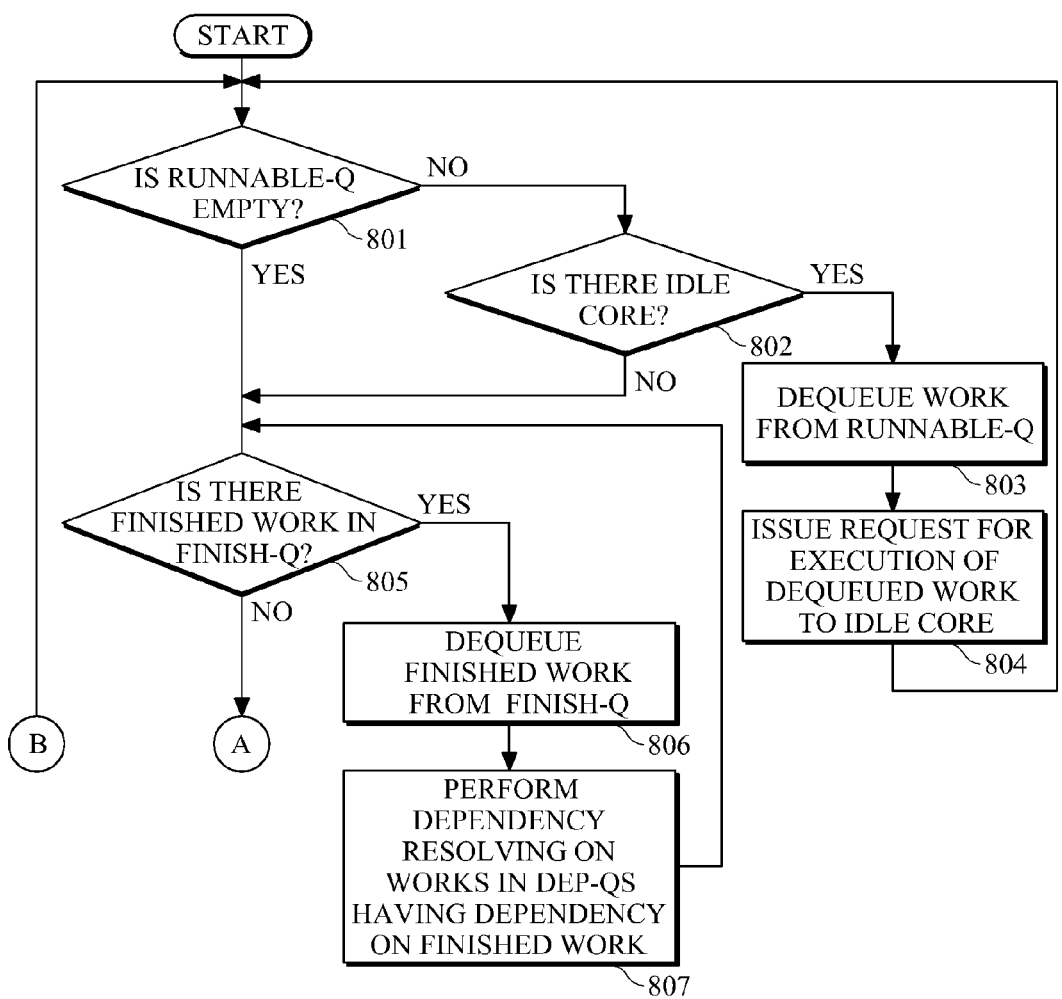
FIGS. 8A and 8B are flowcharts illustrating another example of the scheduling method.
Figure 8B:
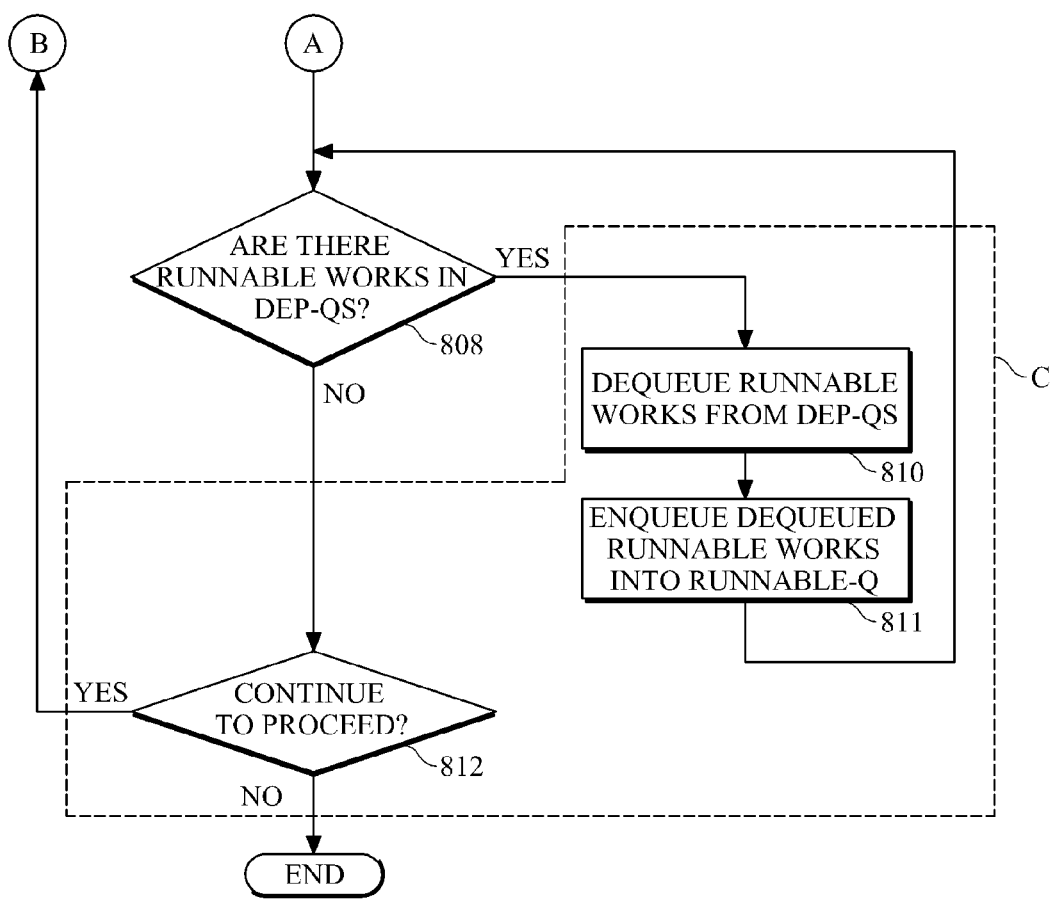

FIGS. 8A and 8B are flowcharts illustrating another example of the scheduling method. Referring to FIGS. 8A and 8B, in order to quickly allocate works to idle cores of a multicore system, the scheduling apparatus may search a runnable-Q for runnable works, may perform dependency resolving on works in a plurality of dep-Qs having dependency on finished works in a finish-Q, and may move dependency-resolved works in the dep-Qs to the runnable Q. By repeating these processes, it is possible for the scheduling apparatus to properly make a schedule for the multicore system.

More specifically, referring to FIG. 8A, it may be determined whether any runnable works are present in the runnable-Q (801). If there is a runnable work in the runnable-Q, it may be determined whether there is an idle core in the multicore system (802). If it is determined in operation 802 that there is an idle core in the multicore system, the runnable work may be dequeued from the runnable-Q (803). Thereafter, a request for the execution of the runnable work may be issued to the idle core of the multicore system (804). Thereafter, the scheduling method may return to operation 801.

If it is determined in operation 802 that none of the cores of the multicore system are idle, it may be determined whether there is a finished work in the finish-Q (805). If it is determined in operation 805 that there is a finished work in the finish-Q, the finished work may be dequeued from the finish-Q (806). Thereafter, dependency resolving may be performed on works, if any, in the dep-Qs having dependency on the finished work (807), and the scheduling method may return to operation 805.

If it is determined in operation 805 that the finish-Q is empty, it may be determined whether there are runnable works with no dependency in the dep-Qs (808). If it is determined in operation 808 that there are runnable works with no dependency in the dep-Qs, the runnable works may be dequeued from the dep-Qs (810), and may be enqueued in the runnable-Q (811). Upon these runnable works being enqueued in the runnable-Q, operation 808 may be performed again to determine whether there are more runnable works with no dependency in the dep-Qs.

Upon determining that there are no runnable works in the dep-Qs, it may be determined whether to continue the scheduling operation (812). If it is determined in operation 812 to continue the scheduling operation, the scheduling method may return to operation 801. Otherwise, the scheduling method may end.

In this manner, it is possible to properly execute a plurality of works provided by one or more applications in consideration of the dependency therebetween. In addition, since a runnable-Q and a finish-Q are both provided in a scheduling apparatus, it is possible to reduce overhead resulting from the synchronization of the scheduling system with an external system, and to perform both dependency resolving and a runnable work search in parallel with the operation of an external system.

Figure 9:
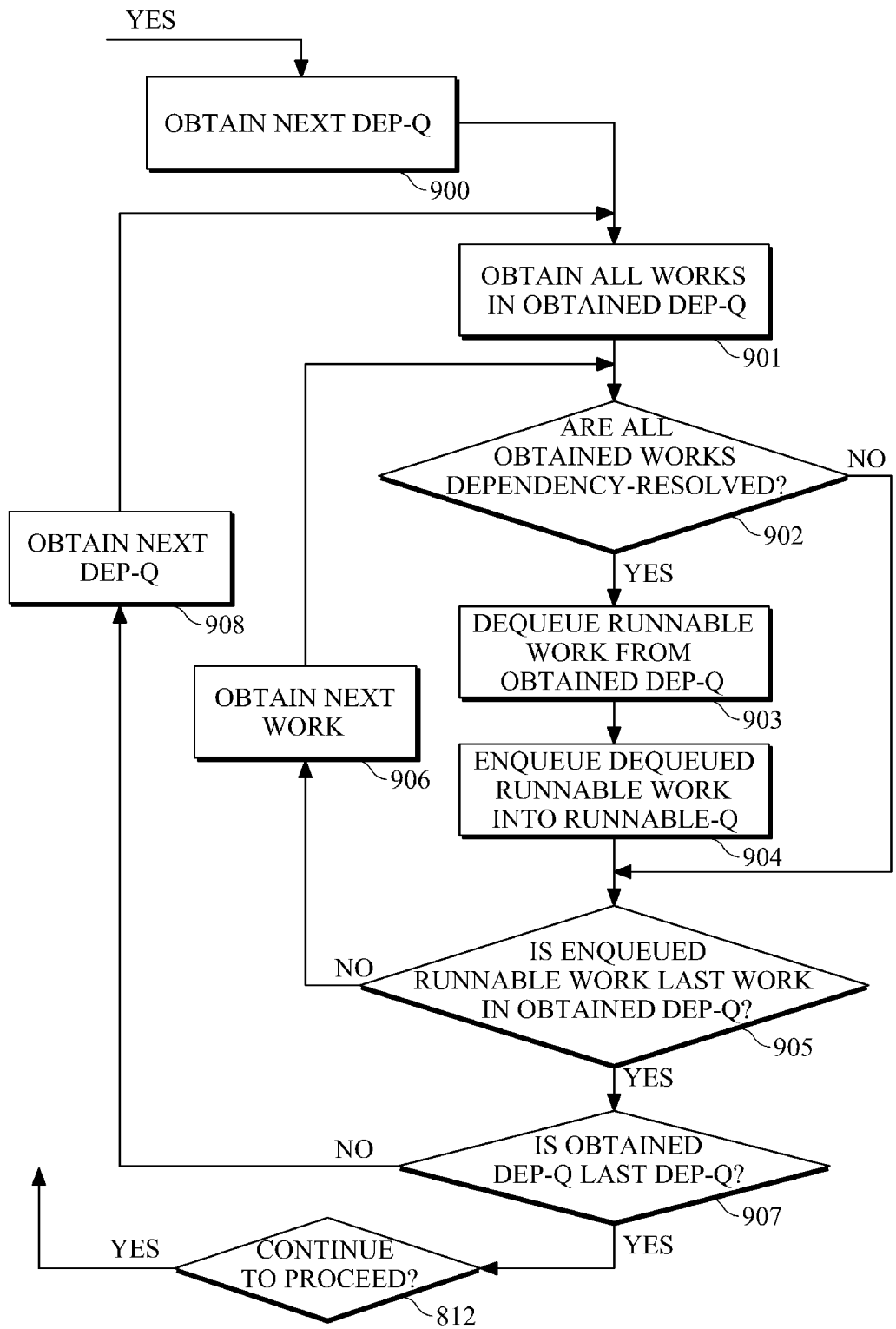
FIG. 9 is a detailed flowchart illustrating part C of FIG. 8B.

FIG. 9 is a detailed flowchart of part C of FIG. 8B. Referring to FIG. 9, if it is determined in operation 808 of FIG. 8 that there are runnable works with no dependency in the dep-Qs in the scheduling apparatus, one of the dep-Qs (e.g., a first dep-Q) may be obtained (900), and one or more works in the first dep-Q may be obtained (901). It may be determined whether the obtained works are all dependency-resolved (902). Thereafter, a runnable work with no dependency may be dequeued from the first dep-Q (903). The dequeued runnable work may be enqueued in the runnable-Q (904).

Thereafter, it may be determined whether the runnable work enqueued in the runnable-Q in operation 904 is the last work in the first dep-Q (905). If it is determined in operation 905 that the runnable work enqueued in the runnable-Q in operation 904 is not the last work in the first dep-Q, another work in the first dep-Q may be obtained (906), and the scheduling method may return to operation 902.

If it is determined in operation 905 that the runnable work enqueued in the runnable-Q in operation 904 is the last work in the first dep-Q, it may be determined whether the obtained dep-Q is the last dep-Q in the scheduling apparatus (907). If it is determined in operation 907 that the obtained dep-Q is not the last dep-Q in the scheduling apparatus, the dep-Q next to the obtained dep-Q may be obtained (908). On the other hand, if it is determined in operation 907 that that the obtained dep-Q is the last dep-Q in the scheduling apparatus, the scheduling method may return to operation 801 of FIG. 8A.

Referring to FIGS. 8A, 8B and 9, operations 805 through 812 or 900 through 907 may be performed during operation 804 or during the execution of works by the multicore system. That is, since dependency resolving and searching for runnable works can be performed in parallel with the execution of works by the multicore system, it is possible to minimize delays in the operation of the scheduling apparatus.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As described above, it is possible to improve the efficiency of the operation of an external system through scheduling. In addition, it is possible to reduce the idle time of each core of a multicore system and thus to improve the efficiency of the multicore system.

Moreover, it is possible to provide one or more queues for storing dependency-resolved works and thus to improve the performance of a multicore system.

Furthermore, it is possible to provide a queue for storing finished works and thus to further improve the efficiency of a multicore system by performing dependency resolving and a runnable work search in parallel with the execution of cores.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling apparatus to allocate works from applications to cores so that the applications share the cores, comprising:
a processor;
a runnable queue, using the processor, configured to enqueue therein the works in order of execution in consideration of any dependency therebetween;
a finish queue, using the processor, configured to enqueue therein finished works whose execution is complete;
one or more dependency queues, using the processor, configured to temporarily enqueue the works therein until the works are enqueued into the runnable queue, wherein each application corresponds to a separate dependency queue;
an I/O (input/output) port configured to transmit the works in the runnable queue to the cores and receive the finished works from the cores; and
a scheduler configured to search the dependency queues for one or more runnable works with no dependency and enqueue the one or more runnable works with no dependency into the runnable queue, to transmit the one or more works in the runnable queue to the cores via the I/O port so that the transmitted one or more works can be executed by any idle one of the cores, and to receive the finished works from the cores via the I/O port and enqueue the received finished works in the finish queue, wherein
the scheduler is further configured to perform dependency resolving on the works in the dependency queues in real time upon the receipt of the finished works from the cores or at regular intervals of time, and
in response to there being one or more works in the dependency queues having dependency on the finished works, the scheduler is further configured to perform dependency resolving on the one or more works having dependency on the finished works and to enqueue the dependency-resolved works into the runnable queue.

2. A scheduling apparatus to allocate works from applications to cores so that the applications share the cores, comprising:
a processor;
a runnable queue, using the processor, configured to enqueue therein the works in order of execution in consideration of any dependency therebetween;
a finish queue, using the processor, configured to enqueue therein finished works whose execution is complete;
one or more dependency queues, using the processor, configured to temporarily enqueue the plurality of works therein until the works are enqueued into the runnable queue, wherein each application corresponds to a separate dependency queue;
an I/O (input/output) port configured to transmit the works in the runnable queue to the cores and receive the finished works from the cores; and
a scheduler configured to search the dependency queues for one or more runnable works with no dependency and enqueue the one or more runnable works with no dependency into the runnable queue, to transmit the one or more works in the runnable queue to the cores via the I/O port so that the transmitted one or more works can be executed by any idle one of the cores, and to receive the finished works from the cores via the I/O port and enqueue the received finished works in the finish queue, wherein
the scheduler is further configured to perform dependency resolving on the works in the dependency queues in real time upon the receipt of the finished works from the cores or at regular intervals of time, and
the scheduler is further configured to perform dependency resolving on one or more works in the dependency queues having dependency on any one of the finished works in the finish queue and to enqueue the dependency-resolved works into the runnable queue.

3. The scheduling apparatus of claim 1, wherein the scheduler is further configured to transmit one of the works from the runnable queue, upon the receipt of one of the finished works from one of the cores, to one of the cores that has transmitted the one of the finished works so that the transmitted work can be executed by the corresponding core instead of any idle one of the cores.

4. The scheduling apparatus of claim 2, wherein the scheduler is further configured to, during the execution of works by the cores, perform the dependency resolving on the one or more works in the dependency queues, search the dependency queues for the one or more runnable works with no dependency, and enqueue the one or more runnable works into the runnable queue.

5. A scheduling method of allocating works provided by applications to cores so that the applications share the cores, the scheduling method comprising:
   searching the works for one or more runnable works with no dependency and enqueuing the runnable works;
   transmitting the runnable works to the cores so that the transmitted runnable works can be executed by any idle one of the cores;
   receiving one or more of the finished works from the cores and enqueuing the received finished works; and
   in response to there being one or more works in the dependency queues having dependency on the finished works, performing dependency resolving on the one or more works having dependency on the finished works and enqueuing the dependency-resolved works into the runnable queue, wherein the dependency resolving comprises performing dependency resolving on the works in the dependency queues in real time upon the receipt of the finished works from the cores or at regular intervals of time.

6. A scheduling method of allocating works from applications to cores using a scheduling apparatus, which includes a runnable queue configured to enqueue therein the works in order of execution in consideration of any dependency therebetween and a finish queue configured to enqueue therein finished works whose execution is complete, so that the applications share the cores, the scheduling method comprising:
   determining whether the runnable queue is empty;
   if there is one or more runnable works in the runnable queue, determining whether any one of the cores is idle;
   if one of the cores is idle, transmitting one of the runnable works in the runnable queue to the idle core;
   if the runnable queue is empty or if none of the cores are idle, determining whether the finish queue is empty; and
   if there is one or more finished works in the finish queue, performing dependency resolving on one or more works within a dependency queue having dependency on any one of the finished works in the finish queue, wherein
   the dependency resolving comprises performing dependency resolving on the works in the dependency queues in real time upon the receipt of the finished works from the cores or at regular intervals of time, and
   in response to there being one or more works in the dependency queues having dependency on the finished works, performing dependency resolving on the one or more works having dependency on the finished works and enqueuing the dependency-resolved works into the runnable queue.

7. The scheduling method of claim 6, further comprising:
   if the finish queue is empty, determining whether there is one or more of the runnable works with no dependency among the works; and
   if there is one or more of the runnable works with no dependency among the works, enqueuing the runnable works in the runnable queue.

8. The scheduling method of claim 7, wherein after the transmitting of the runnable works in the runnable queue to the respective idle cores, or if there is no runnable work among the works, the scheduling method returns to the determining of whether the runnable queue is empty.

9. The scheduling method of claim 8, further comprising:
   if there is one or more runnable works with no dependency among the works, obtaining all works provided by the same applications as the runnable works;
   performing dependency resolving on the obtained works in connection with the finished works in the finish queue; and
   enqueuing the dependency-resolved works into the runnable queue.

10. The scheduling method of claim 7, wherein the scheduling method is performed at least partially during the execution of the works by the cores.

11. The scheduling method of claim 9, wherein, if there is one or more runnable works with no dependency among the works and the runnable works are provided by more than one application, performing dependency resolving on all works provided by each of the applications and enqueuing the dependency-resolved works into the runnable queue.

12. A scheduling apparatus to allocate works to a plurality of processing cores so that the applications share the cores, comprising:
   a processor;
   a dependency queue, using the processor, configured to enqueue works of an application;
   a runnable queue, using the processor, configured to enqueue works transferred from the dependency queue;
   a finish queue, using the processor, configured to enqueue works that have been executed by the processing cores; and
   a scheduler, using the processor, configured to:
   transfer a work having no dependency on the execution completion of another work from the dependency queue to the runnable queue,
   transfer the work from the runnable queue to an idle one of the processing cores for execution,
   transfer the work executed by the one processing core to the finish queue, where the work is designated a finished work,
   transfer a work within the dependency queue, having a dependency upon the finished work, to the runnable queue; and
   perform dependency resolving on the works in the dependency queues in real time upon the receipt of the finished works from the cores or at regular intervals of time.

13. The scheduling apparatus of claim 12, further comprising:
   multiple dependency queues, using the processor, that each is assigned to enqueue works of a single application, wherein:
   the scheduler transfers a work lacking a dependency on the execution completion of another work from each of the dependency queues to the runnable queue.

14. A scheduling method that allocates a plurality of works to a plurality of processing cores so that the applications share the cores, the method comprising:
   transferring a work having no dependency on the execution completion of another work from a dependency queue to a runnable queue;

transferring the work from the runnable queue to an idle one of the processing cores for execution;

transferring the work executed by the one processing core to a finish queue, where the work becomes designated a finished work;

transferring a work within the dependency queue, having a dependency upon the execution completion of the finished work, to the runnable queue; and performing dependency resolving on the works in the dependency queues in real time upon the receipt of the finished works from the cores or at regular intervals of time.

15. The scheduling method of claim 14, further comprising:

transferring a work having no dependency on the execution completion of another work from each of a plurality of dependency queues to the runnable queue, wherein each of the plurality of dependency queues that each is assigned to enqueue works of a single application.

* * * * *